(12) United States Patent
Bremer

(10) Patent No.: US 8,272,676 B2
(45) Date of Patent: Sep. 25, 2012

(54) TARP DEPLOYING APPARATUS

(75) Inventor: Donald William Bremer, Sioux City, IA (US)

(73) Assignee: Sioux City Tarp, Inc., Sioux City, IA (US)

( * ) Notice: Subject to any disclaimer, the term of this patent is extended or adjusted under 35 U.S.C. 154(b) by 309 days.

(21) Appl. No.: 12/724,512

(22) Filed: Mar. 16, 2010

(65) Prior Publication Data

US 2010/0230993 A1    Sep. 16, 2010

Related U.S. Application Data

(60) Provisional application No. 61/182,347, filed on May 29, 2009, provisional application No. 61/160,526, filed on Mar. 16, 2009.

(51) Int. Cl.
    *B60J 11/00* (2006.01)
(52) U.S. Cl. .......................................................... 296/98
(58) Field of Classification Search .................... 296/98, 296/100.14, 100.11, 100.12, 100.15, 105, 296/100.1, 100.17, 100.16, 100.18; 280/730.1, 280/730.2, 735
    See application file for complete search history.

(56) References Cited

U.S. PATENT DOCUMENTS

| | | | | |
|---|---|---|---|---|
| 1,318,820 A | * | 10/1919 | Watkins | 296/98 |
| 2,976,082 A | * | 3/1961 | Dahlman | 296/98 |
| 4,225,175 A | * | 9/1980 | Fredin | 296/98 |
| 4,302,043 A | * | 11/1981 | Dimmer et al. | 296/98 |
| 4,659,134 A | * | 4/1987 | Johnson | 296/98 |
| 4,673,208 A | * | 6/1987 | Tsukamoto | 296/98 |
| 4,691,957 A | * | 9/1987 | Ellingson | 296/98 |
| 4,834,445 A | | 5/1989 | Odegaard | |
| 5,002,328 A | * | 3/1991 | Michel | 296/98 |
| 5,076,174 A | | 12/1991 | Martin | |
| 5,180,203 A | * | 1/1993 | Goudy | 296/98 |
| 5,186,231 A | * | 2/1993 | Lewis | 160/310 |
| 5,211,440 A | | 5/1993 | Cramaro | |
| 5,240,304 A | | 8/1993 | Cramaro et al. | |
| 5,328,228 A | * | 7/1994 | Klassen | 296/98 |
| 5,429,403 A | * | 7/1995 | Brasher | 296/32 |
| 5,466,030 A | * | 11/1995 | Harris et al. | 296/98 |
| 5,765,901 A | * | 6/1998 | Wilkens | 296/98 |
| 5,944,374 A | | 8/1999 | Searfoss | |
| 6,007,138 A | | 12/1999 | Cramaro | |
| 6,142,554 A | * | 11/2000 | Carroll et al. | 296/100.12 |

(Continued)

OTHER PUBLICATIONS

Cramaro Wrap N' Roll, 1 page brochure.

*Primary Examiner* — Kiran B Patel
(74) *Attorney, Agent, or Firm* — McKee, Voorhees & Sease, P.L.C.

(57) ABSTRACT

A tarp deploying apparatus of the type that has radial arms pivotally attached at the front and rear of a trailer. A housing for supporting a tarp roll and a motor is pivotally attached at the free end of a radial arm such that the tarp roll and housing will tuck under a side lip at an upper portion of the side of the trailer. The rear radial arm is formed with a bend between the pivotal attachment point to the rear of the trailer and the free end of the radial arm, such that the free end of the radial arm is closer to the front of the trailer. A roller with enhanced traction characteristics helps to move the apparatus out of a storage position. A spring used to bias the radial arms can be adjusted to adjust the amount of biasing force.

9 Claims, 7 Drawing Sheets

U.S. PATENT DOCUMENTS

| | | | |
|---|---|---|---|
| 6,199,935 B1 * | 3/2001 | Waltz et al. | 296/98 |
| 6,206,449 B1 * | 3/2001 | Searfoss | 296/98 |
| 6,478,361 B1 * | 11/2002 | Wood | 296/98 |
| 6,513,856 B1 * | 2/2003 | Swanson et al. | 296/98 |
| 6,527,331 B2 * | 3/2003 | Searfoss | 296/100.18 |
| 6,595,594 B2 * | 7/2003 | Royer | 296/98 |
| 6,616,211 B2 | 9/2003 | Cramaro | |
| 6,641,199 B1 * | 11/2003 | Hicks | 296/98 |
| 6,779,828 B1 * | 8/2004 | Poyntz | 296/98 |
| 6,783,168 B2 * | 8/2004 | Searfoss | 296/98 |
| 6,805,395 B2 * | 10/2004 | Royer | 296/98 |
| 6,916,060 B2 | 7/2005 | Searfoss | |
| 6,926,337 B2 * | 8/2005 | Poyntz | 296/98 |
| 6,979,043 B2 * | 12/2005 | Leischner et al. | 296/98 |
| 7,032,950 B2 * | 4/2006 | Eggers et al. | 296/98 |
| 7,188,887 B1 * | 3/2007 | Schmeichel | 296/98 |
| 7,246,838 B2 | 7/2007 | Searfoss | |
| 7,703,833 B2 * | 4/2010 | Petelka | 296/98 |
| 7,726,720 B2 * | 6/2010 | Searfoss | 296/100.01 |
| 8,056,955 B1 * | 11/2011 | Schmeichel | 296/98 |
| 8,162,377 B2 * | 4/2012 | Miller et al. | 296/98 |
| 2003/0090124 A1 * | 5/2003 | Nolan et al. | 296/98 |
| 2008/0042466 A1 | 2/2008 | Searfoss | |

* cited by examiner

TARP DEPLOYING APPARATUS

CROSS-REFERENCE TO RELATED APPLICATIONS

This application claims priority under 35 U.S.C. §120 to provisional application Ser. No. 61/182,347 filed May 29, 2009 and to provisional application Ser. No. 61/160,526 filed Mar. 16, 2009, both of which are hereby incorporated by reference in their entireties.

FIELD OF THE INVENTION

This invention relates to tarp deploying apparatuses, and in particular to apparatuses used for deploying tarps to cover the open beds of the trailers.

BACKGROUND OF THE INVENTION

Trailers used to haul loose materials such as dirt, sand, gravel, or grain commonly have beds or tubs that have an open top with generally vertical front and rear walls and sloping sidewalls for retaining contents within the trailer. Therefore, if the trailer bed is not covered as the trailer is pulled over the road, the loose contents may be blown and scattered out of the open top of the trailer bed. Additionally, the contents of the trailer bed may be compromised by rain, or other contaminants. Accordingly, it is known to deploy tarps across the open top space of the trailer beds to cover the contents of the trailer beds.

Several mechanisms have been devised for deploying the tarps across the trailer bed. Many of these devices include radial arms that are rotatably mounted at the front and rear of the trailer bed and have a roll of tarp disposed between them. As the radial arms rotate in one direction across the truck bed, the roll of tarp between the arms is unrolled to cover the contents of the truck bed. When the arms are rotated back in the opposite direction, the tarp is taken back up upon the roll to uncover the trailer bed. Examples of such devices may be seen in Searfoss, U.S. Pat. No. 6,206,449 and in Michel, U.S. Pat. No. 5,002,328.

It is also common for these trailers to be adapted to dump their contents to one side or the other of the trailer, by elevating the opposite side of the trailer. In many of these side dump trailers, the trailers include a lip that projects outwardly along the side edges of the top periphery of the bed. As shown in the previously mentioned '449 patent, it is known and desirable to tuck the tarp roll underneath the projecting lip in order to store the tarp, especially during dumping operations, but also preferably when the tarp is fully deployed covering the trailer.

In order to tuck the tarp roll against the side of the trailer, it is known to attach the tarp roll to extensions that are pivotally connected to the free ends of the radial arms. According to one design, the radial arms are biased towards the covered side, and a motor attached to one of the extensions rotates the tarp roll to pull the tarp back across the trailer bed to the open configuration. Springs may be used to bias the extensions relative to the radial arms. According to one design the springs used to bias the extension relative to the radial arm are spiral torsion springs similar to those shown in Searfoss, U.S. Pat. No. 5,944,374.

The trailers of the type discussed above occasionally need to be provided into locations where the rear of the trailer is close against an obstruction, such as a building, tree, or overhang. In these instances, it is desirable to have the top of the radial arms be close to the trailer bed to minimize any interference by the tarp deploying apparatus with obstructions behind the trailer.

The tarp deploying mechanisms of the type discussed above occasionally have difficulty moving out of the stored and deployed position when they are tucked beneath the side lip. Furthermore, it can be difficult to obtain the correct biasing force for the radial arms, particularly as the apparatus ages and the resiliency or biasing force of the spring naturally diminishes.

Therefore, it is an object of the present invention to provide an improved tarp deploying apparatus generally of the type disclosed above wherein the ends of the arms used to deploy the tarp roll are brought in close proximity to a rear edge of the top of the trailer bed, wherein the apparatus is less prone to being stuck or hung up in the deployed and uncovered storage positions, and wherein the biasing force applied to the radial arms can be varied over time.

BRIEF SUMMARY OF THE INVENTION

According to one embodiment, the present invention relates to an improved apparatus for deploying a tarp across the top open portion of a trailer bed. In particular the apparatus is intended for use on a side dump trailer. The invention includes radial arms that are pivotally attached at the front and rear of the trailer. The radial arms are pivotally attached at their lower portions to the front and rear of the trailer respectively. A helical torsion spring is provided at the lower end of the radial arms to provide a biasing force that biases the radial arms towards their deployed position. At the upper free ends of the radial arms a housing is pivotally attached. Springs may be provided between the radial arm and the housing to bias the housing relative to the end of the arms. Each of the housings has a motor attached for providing a rotating force to a roller that has a tarp wound around it. The pivotal connection between the ends of the radial arms and the housings permit the housings with attached tarp roll to tuck under the lips on the side of the trailer. The biasing force applied by the springs between the ends of the radial arms and the housings is useful for articulating the housing around the lip to effectively move it into and out of the tucked storage positions. According to one improvement, the rear radial arm includes a bend between the pivotally attached end of the arm and the free end of the arm in order to bring the free end of the arm in close proximity to the rear edge of the trailer. This is beneficial because it permits the tarp to be deployed in situations where the rear of the trailer is close to an overhang or other obstruction that might otherwise interfere with deployment of the tarp. According to another improvement, rollers with enhanced traction surfaces are utilized on the tarp spool or spindle to grip the side of the trailer to aid in moving the housing in and out of the storage positions. According to yet another improvement, a spring that is used to bias one of the radial arms can be adjusted into several different positions to vary the amount of biasing force applied by the spring.

According to one embodiment, the present invention relates to an improvement in a tarp deploying apparatus of the type having a radial arm pivotally attached at the rear of a side dump trailer, wherein a tarp roll is provided at a free end of the radial arm. The improvement includes pivotally attaching a housing for supporting the tarp roll and a motor at the free end of the radial arm such that the tarp roll and housing will tuck under a side lip at an upper portion of the side of the trailer. Further, the radial arm is formed with a bend between the pivotal attachment point to the rear of the trailer and the free end of the radial arm, such that the free end of the radial arm is closer to the front of the trailer than is the attached end of the radial arm.

According to another embodiment, the present invention relates to an improvement in a tarp deploying apparatus of the type having a radial arm pivotally attached at the rear of a side dump trailer. The improvement, according to this embodiment relates to providing rollers on the tarp spool or spindle that have an enhanced traction surface.

According to another embodiment, the present invention relates to an improvement in a tarp deploying apparatus of the type having radial arms pivotally attached at the ends of a side dump trailer, wherein a tarp is provided at a free end of the radial arms, and a helical torsion spring is provided at the attached end of each radial arm. The improvement lies in the provision of several possible positions for the torsion springs to allow adjustment of the biasing force provided by the torsion springs.

DETAILED DESCRIPTION OF THE PREFERRED EMBODIMENT

Figure 1:
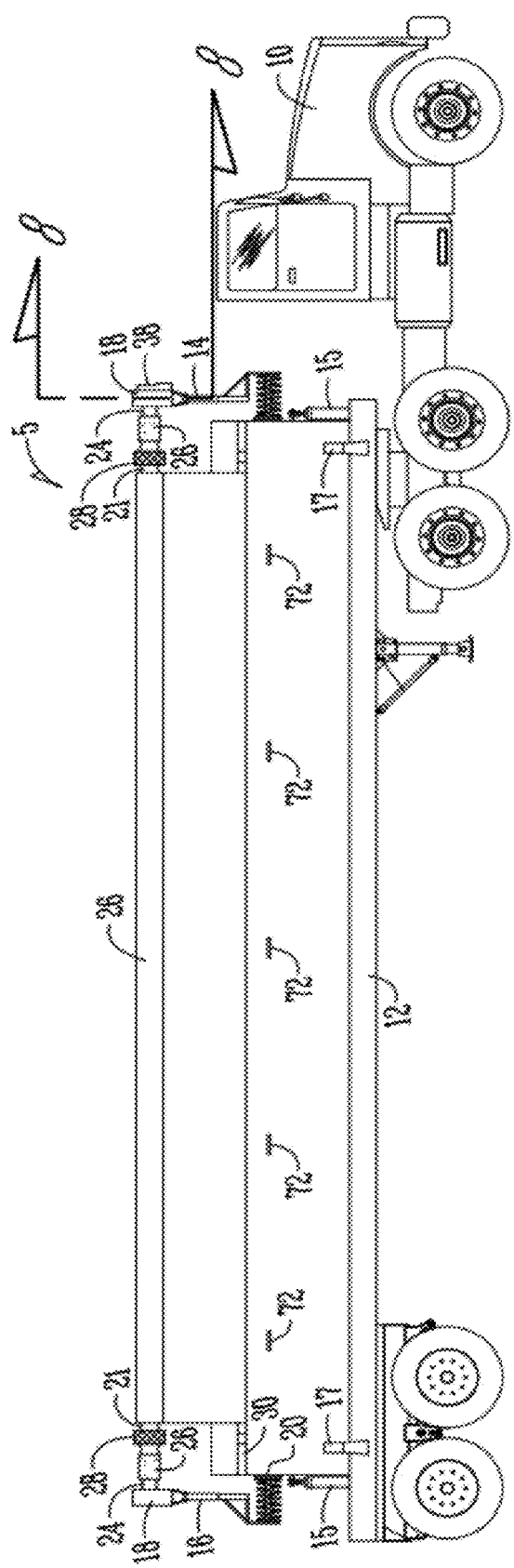
FIG. 1 is a side elevation view of a truck and trailer with a tarp deploying apparatus according to one embodiment of the present invention wherein the tarp is partial deployed about mid way between the open and closed positions.

FIG. 1 shows a truck 10 with an attached trailer 12. A tarp deploying apparatus 5 according to one embodiment of the present invention is provided on the trailer 12. The trailer 12 shown in FIG. 1 is a side-dump trailer that includes a tub 13 that can carry a load, such as sand, dirt, gravel, grain, or the like and dump the load to either side. The dumping action is accomplished by extending hydraulics 15 at each end of the tub 13 and selectively restraining or allowing the tub to pivot about releasable pivot connections 17. A tarp 26 is provided to cover a load within the tub 13. The tarp should be a flexible durable material, and may be reinforced by straps of material such as the type used in making automobile seat belts. The tarp 26 may be affixed along one side of the tub 13. In the embodiments shown in the drawings, the tarp is affixed on the right hand side (passenger side) near the top of the tub 13. Therefore when the tarp 26 is rolled up it is on the right hand side of the tub 13. When it is deployed to cover the load, a free end of the tarp 26 is stretched across to the left hand (driver) side. It should be appreciated that the tarp deploying apparatus 5 could be mounted in the opposite configuration such that is stores in the open position on the driver side. It should further be appreciated that the tarp deploying apparatus 5 may be advantageously used on other types of trailers and indeed other non-mobile structures that require selective covering and uncovering by a tarp.

The tarp deploying apparatus includes a front radial arm 14 and a rear radial arm 16 that are pivotally connected to the front wall 75 and rear wall 76 of the tub 13 respectively. An extension, such as a housing 18 is provided at a free end of each of the radial arms 14, 16. The housings 18 are pivotally attached to the free ends of the radial arms 14, 16. A lower end of the rear radial arm 16 is pivotally attached to the rear of the tub 13. Mounting bases 20 are attached at the front and rear of the tub 13 to provide a location for mounting the radial arms 14 and 16. A helical torsion spring 22 provides a biasing force against the rear radial arm 16 that tends to urge the radial arm 16 towards the driver's side of the trailer 12 towards a deployed position. Other biasing means than a helical torsion spring might be used. For example, a spiral torsion spring or other known biasing mechanism.

A rotatable spindle 24 extends from each of the housings 18 to engage a roll tube 21 that acts as a spool for a tarp 26 that is wrapped around the roll tube 21. The roll tube 21 spans between the spindles 24 at the top of the radial arms 14, 16. A motor 34 may be attached to one or both of the housings 18 to provide a rotational drive to the spindle 24 and thereby to the roll tube 21 on which the tarp 26 is wound. Rollers 28 are provided on the roll tube 21 between the housing 18 and the tarp 26. Preferably the rollers 28 will be made of a relatively soft material and include grooved treads to provide some traction as the rollers 28 engage a lip 30 on the sides of the tub 13 as will be explained in more detail below.

FIGS. 2, 3, 4 and 5 are rear elevation views of tub 13 with a tarp deploying apparatus 5. These Figures show how the radial arm 16 pivots across the rear of the tub 13 to deploy the tarp 26, and further how the housing 18 pivots relative to the radial arm 16 to tuck the tarp 26 and roller 28 under the lip 30.

Figure 2:
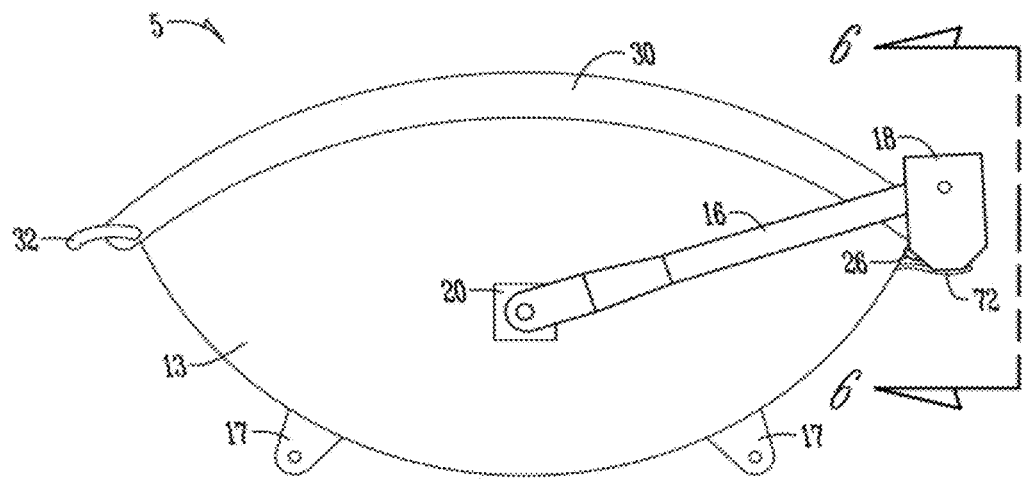
FIG. 2 is a rear elevation view of the tarp deploying apparatus of FIG. 1 on a trailer tub in an open position.

In FIG. 2, the tarp 26 is in an undeployed configuration, with the housing 18 pivoted in a clockwise direction relative to the radial arm 16 to tuck the roll tube and tarp 26 under the lip 30 of the passenger side of the tub 13. In this configuration the force of the torsion spring 22 (not visible in FIG. 2) acting on radial arm 16 urges the housing 18 upward and to the left, which presses the tarp rolled on the roll tube and the roller 28 into the underside of the lip 30 (see FIG. 6), which restrains the assembly in the storage position of FIG. 2. It should be understood that the lip 30 may extend beyond the surface of the side of the tub 13, or may be coterminous with the outer surface of the sidewall of the tub 13.

Figure 6:
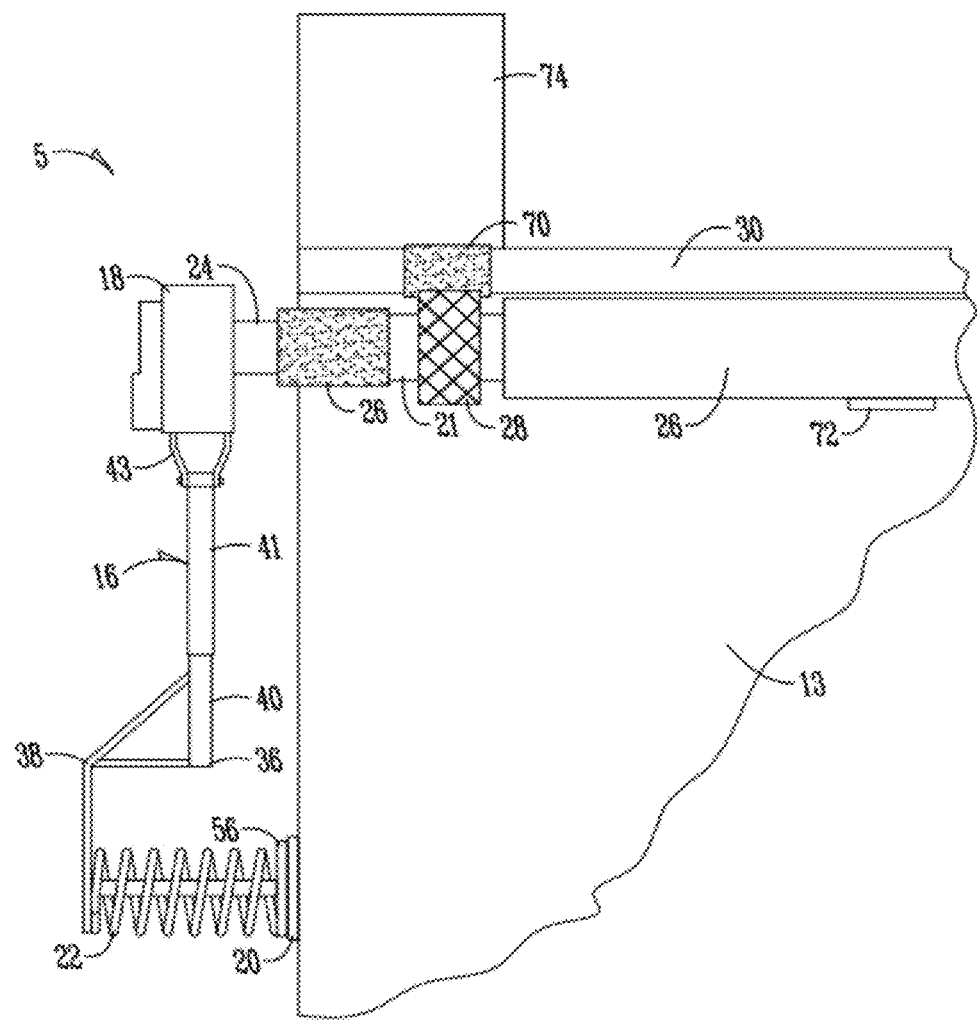
FIG. 6 is a partial side elevation detail view of the tarp deploying apparatus in the open position taken at the rear of the trailer.

FIG. 6 shows a partial side view of the deploying apparatus 5 from FIG. 2. The roller 28 is preferably in contact with the side of the tub 13 and in particular with the lip 30. A traction mat 70 may be attached to the lip 30 in alignment with the roller 28 to provide a better gripping surface for the roller 28 to ride upon than the relatively slick surface of the lip 30. According to one embodiment the traction mat 70 is formed from a fabric-backed rubber with a roughened surface. In this position the tarp 26 is nearly entirely rolled up upon the roll tube 21. As noted above, a portion of the tarp 26 is affixed to the tub 13 near the top. This can be accomplished through a variety of mechanisms that are well known to those of skill in the art. The tarp 26 may be partially supported by brackets 72 that extend from the side of the tub 13. The rear wall 74 of the tub 13 extends above the side walls to provide higher support and coverage for the central portion of the tub 13 that may include material piled higher than the lip 30 of the tub 13. A protective sleeve 76 covers a portion of the roll tube 21 between the housing 18 and the roller 28. The protective sleeve 76 may be made from the same fabric-backed rubber as the traction mat 70. The rear radial arm 16 is provided with a bent section 36 in order to move the housing 20 at the free end of the rear radial arm 16 into closer proximity to the rear of the tub 13.

As seen in FIG. 6, the bent section 36 has a lower portion 38 for pivotal attachment to the rear of the tub 13 and engagement with the helical torsion spring 22. The bent section 36 further includes an upper portion 40 that is offset from the lower portion and connects with an elongated shaft 41. A brace 39 is provided as part of the lower portion 38 to provide additional strength. The spring 22 acts between mounting base 20 and the lower portion 38 to urge the radial arm 16 towards the closed position. An attachment bracket 43 pivotally connects the shaft 41 with the housing 18. The bend between the pivotally attached end of the arm 16 and the free end of the arm 16 is provided in order to bring the free end of the arm 16 in close proximity to the rear edge of the tub 13. This is beneficial because it permits the tarp 26 to be deployed in situations where the rear of the trailer is close to an overhang or other obstruction that might otherwise interfere with deployment of the tarp 26. As seen in FIG. 1, the lower portion of the front radial arm 14 does not include any offset portion, as it is generally not important that the front portion of the tarp deploying apparatus be brought in close to the front edge of the tub 13, because the truck 10 is generally in front of the tub 13 when in use. However, it should be appreciated that the bent arm arrangement could also be used to form the front radial arm 14.

Figure 3:
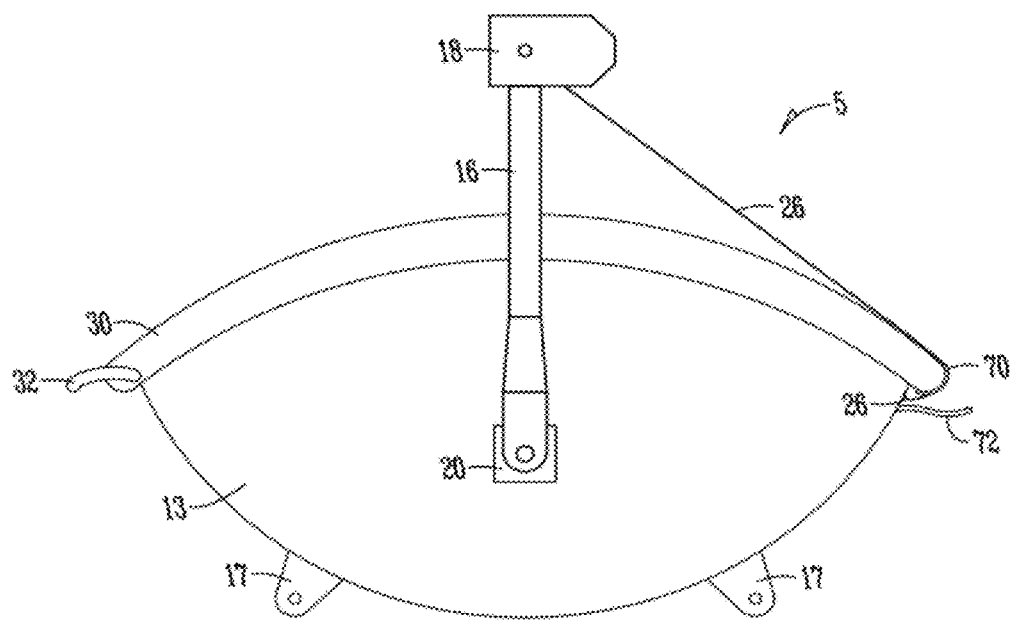
FIG. 3 is a rear elevation view of the tarp deploying apparatus of FIG. 2 in a partially deployed position.
Figure 8:
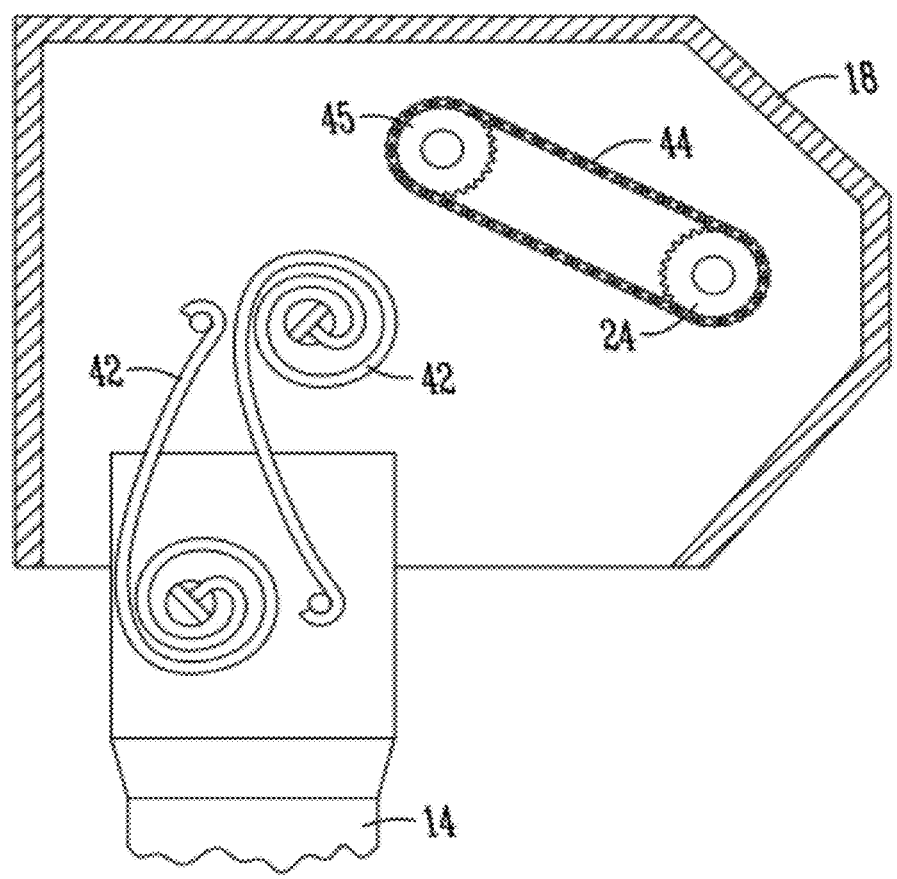
FIG. 8 is a cross-section view of the rear radial arm and housing taken along line 8-8 as indicated in FIG. 1.

In FIG. 3, the radial arm 16 has rotated about halfway towards the driver's side of tub 13 to the position also shown in FIG. 1 such that the tarp 26 is partially deployed. In order to get out of the tucked position of FIGS. 2 and 6, it was necessary for the housing 18 to rotate counter clockwise relative to the radial arm 16 in order for the tarp 26 on the roll tube 21 to clear the lip 30. This is effected by rotating the spindle 24 with the motor 34, which in turn rotates the roll tube 21. This creates slack in the tarp 26. Furthermore, the roller 28, in close contact with the traction mat 70 pulls the assembly out and around the lip 30 as it rotates. As described in more detail below related to FIG. 10, the roller 28 is provided with a traction enhancing tread to increase the coefficient of friction between the roller and the lip 30 and/or the mat 70. A structure for the connection between the front radial arm 14 and the housing 18 is shown in FIG. 8. The connection between the rear radial arm 16 and the housing 18 is similar, except that typically the housing 18 for the rear radial arm 16 typically will not include a motor. This structure biases the housing 18 towards the tucked position, but not quite to the fully tucked storage position. The structure also includes a spring oriented in the opposite direction to help get housing 18 out of the fully tucked position. Once the tarp 26 and the roll tube 21 clear the lip 30, the force of the helical torsion spring 22 acting against the radial arm 16 (and the front spring 22 acting against the front radial arm 14) moves the assembly to the position of FIG. 3.

Figure 4:
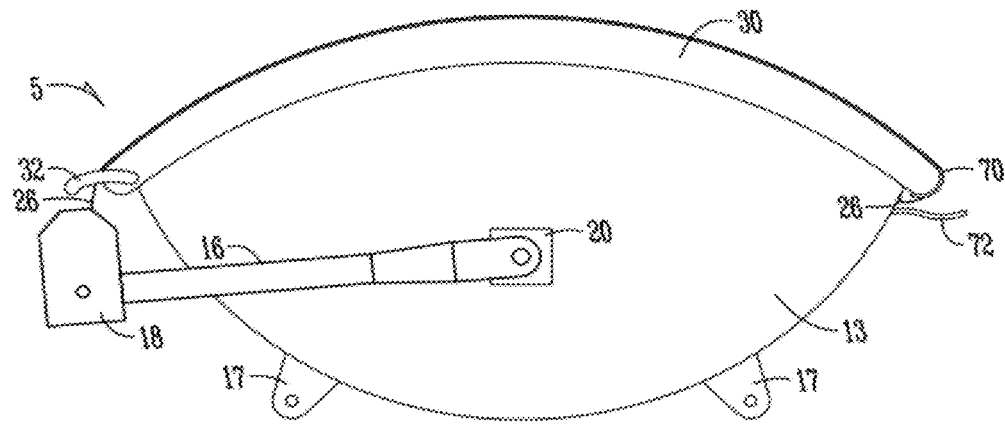
FIG. 4 is a rear elevation view of the tarp deploying apparatus of FIG. 3 in a closed position with the tarp fully unrolled.

In FIG. 4, the radial arm 16 has been rotated to the full extend allowed by the tarp 26, which is fully unrolled from the roll tube. Movement from the intermediate position of FIG. 3 to the position of FIG. 4 is implemented primarily by the force of the springs 22 acting on the radial arms 16 (and 14), which keeps the tarp 26 relatively taunt and tends to unroll it from the roll tube. The motor 34 (see FIG. 1) also continues to rotate the roll tube.

Figure 5:
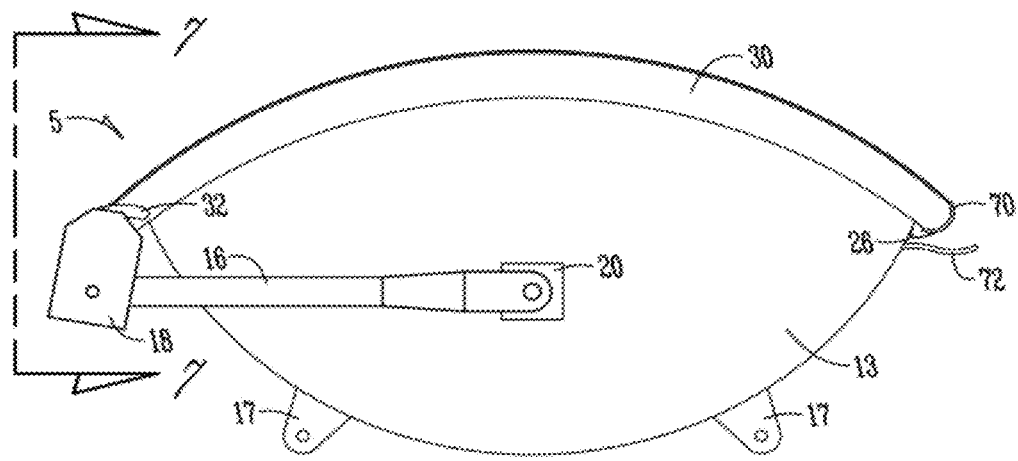
FIG. 5 is a rear elevation view of the tarp deploying apparatus of FIG. 4 in a closed position with the tarp roll stored against the side of the tub.

To move from the position of FIG. 4 to the fully deployed position of FIG. 5, the motor continues to rotate the roll tube (in the counterclockwise position as viewed in FIG. 5, if the roll tube was visible), which causes the housing 18 to climb upward against the tension in the tarp 26. In FIG. 5 the radial arm 16 has rotated to a fully deployed position such that the tarp 26 is completely covering the open top of the tub 13. The housing 18 is again rotated slightly in a clockwise direction relative to the end of the radial arm 16 in order to tuck the roller 28 beneath the lip 30 on the driver's side of the tub 13. The roller 28 acting against the lip 30 provides the necessary force to rotate the housing 18 to the cocked fully deployed position of FIG. 5. The catch 32 extending from the lip 30 acts to catch the roll tube 21 and retain it in the fully deployed position. This is especially important when travelling because air moving under the tarp 26 tends to create a lifting force that could lift the tarp 26 out of position if the catch 32 did not restrain the roll tube.

Figure 7:
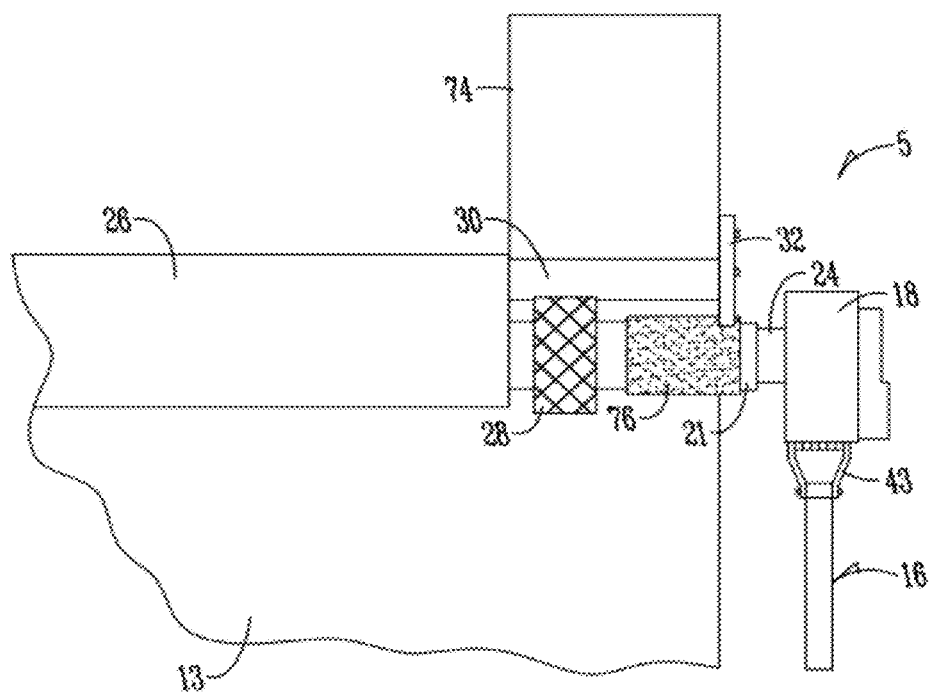
FIG. 7 is a partial side elevation detail view of the tarp deploying apparatus in the closed position with the tarp roll stored against the side of the tub taken at the rear of the trailer.

FIG. 7 is a partial side view taken from the angle indicated in FIG. 5. The roller 28 is in close engagement with the side of the tub 13 and in particular with the lip 30. The catch 32, extends beyond the outer edge of the driver side of the tub 13. In the fully deployed position of FIGS. 5 and 7 the catch 32 restrains the roll tube 21 from moving upward, especially when the truck is moving and a lifting force is created by air movement under the tarp 26. Preferably the protective sleeve 76 aligns with the catch 32 to protect the roll tube 21. The protective sleeve 76 may be formed from the same material as the traction mat 70. The protective sleeve 76 may be attached to the roll tube 21 by mechanical fasteners such as screws or rivets. Those of skill in the art will be aware of other means of attaching the sleeve 76, such as adhesives, friction fit, a combination of any of these, or other known means. The protective sleeve 76 also provides protection for the roll tube 21 when the roll tube 21 is moving across the top the catch 32 as the tarp 26 is being deployed and removed. The protective sleeve 76 can also provide enhanced friction to provide some traction by the sleeve against the catch 32 to help move the apparatus 5 out of the fully deployed position.

To return the tarp 26 to the uncovered position of FIG. 2 from the deployed position of FIG. 5, it is necessary to activate the motor 34 to provide a rotating force to the spindle 24 (in a clockwise direction as viewed from the rear as in FIGS. 2-5). Upon initial activation of the motor, the housing 18 and tarp roll will move downward to the position of FIG. 4. Continued rotation of the motor causes the tarp to move upward and over the lip 30. The rollers 28 help in guiding the roll tube 21 over the lip 30. The rotational force of the motor 34 applied to the roll tube 21 through the spindle 24 will tighten the tarp 26 to move the radial arm 16 across the tub 13 to the intermediate position of FIG. 3, and eventually back to the tucked storage position of FIG. 2.

FIG. 8 is a partial cross section of the housing 18 and rear radial arm 14 taken along the line indicated in FIG. 1. As can be seen in FIG. 8, the housing 18 includes springs 42 that bias the housing 18 relative to the free end of the radial arms 14, 16. The springs 42 are provided to bias the housing towards a neutral position when it moves off of the neutral position in either direction. According to the embodiment shown the springs 42 are spiral torsion springs of the type shown and described in U.S. Pat. No. 6,206,449, which is hereby incorporated by reference in its entirety. A chain drive 44 acts as a transmission to transmit the force from a drive shaft 45 the motor 34 to the spindle 24. Those of skill in the art may be aware of other mechanisms for biasing the housing 18 towards the neutral position. Furthermore, the transmission could take a variety of forms such as direct drive, belt drive, or other conventional transmission.

Figure 9:
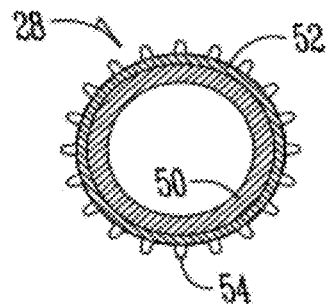
FIG. 9 is a cross-section view of a roller with traction enhancing surface according to one embodiment of the present invention.

FIG. 9 shows a cross sectional view of the roller 28 according to one embodiment of the present invention. The roller 28 includes a roller body 50 that is held in place in tight engagement with the roll tube 21. The roller body 50 may be held in place on the roll tube 21 by friction, adhesive, melting, or mechanical fasteners such as a threaded fastener or the like. The roller body 50 is preferably formed from a resilient material, such as foam rubber. The roller body 50 is surrounded by a traction sleeve 52. The traction sleeve 52 should be a material with a high coefficient of friction, such as tire rubber, in order to provide good traction for the roller 28 as it helps to move the tarp out of the closed position by engaging the side of the tub 13. The traction sleeve 52 is preferably provided with a tread pattern 54 formed by protrusions and grooves to enhance the traction of the roller 28. The traction sleeve 52 may be formed from rubber or similar material. The traction sleeve 52 may be held in place by adhesive, melting, or mechanical fasteners. Alternatively, the tread pattern 54 may be molded directly into the roller body 50 to form a unitary piece.

Figure 10:
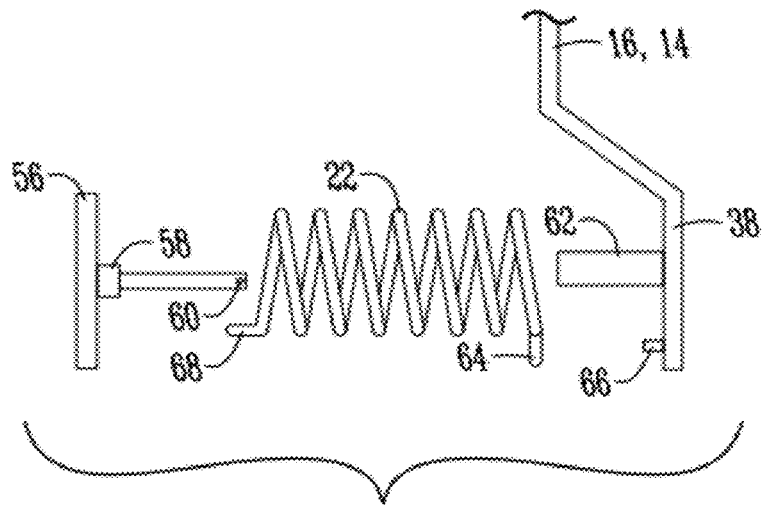
FIG. 10 is an assembly view of the radial arm biasing mechanism according to one embodiment of the present invention.
Figure 11:
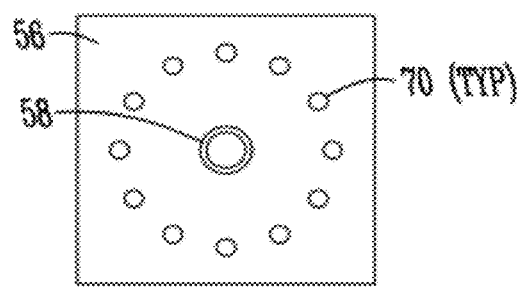
FIG. 11 is a front view of a pivot plate having multiple positions for engaging a torsion spring according to one embodiment of the present invention.

FIG. 10 shows an exploded view of the mechanism for biasing the radial arms 14 and 16 towards the deployed position. A pivot plate 56 is suitable for attachment to the mounting base 20 (not shown in FIG. 10). The pivot plate 56 includes a stepped shaft 58 that extends away from the tub 13 when the pivot plate 56 is mounted in a working position. The stepped shaft 58 may be provided with an opening 60 near its free end for receiving a cotter pin (not shown) or other fastening structure. A hollow shaft 62 extends from the lower portion 38 of the rear radial arm 16 towards the pivot plate 56. When assembled, the stepped shaft 58 is received within hollow shaft 62 with the coils of the helical torsion spring 22 surrounding the shafts 58 and 62. In this fashion, the spring 22 is captured between the pivot plate 56 and the lower portion 38 of the rear radial arm 16. The spring 22 includes a first portion in the form of a bent tab 64 that extends generally radially outwardly from the spring coils of the spring 22 at the end of the spring 22 proximate to the radial arm 16. The bent tab 64 engages a protrusion 66 that extends from the interface of the lower portion 38 of the radial arm 16. A second portion of the spring 22 in the form of a second bent tab 68 extends generally axially towards the pivot plate 56. The tab 68 may be received within one of a plurality of openings 70 (see FIG. 11) provided in the pivot plate 56. The amount of biasing force provided by the spring 22 may be varied by selecting the appropriate one of the openings 70 to insert the tab 68. In this fashion, the apparatus can accommodate tarps of different length and weight, which may require different amounts of biasing force. Additionally, as the apparatus ages, the biasing force of the spring 22 may naturally diminish, which can be corrected by rotating the spring 22 to insert the tab 68 in a different opening 70 to increase the rotation, and hence biasing force applied by the spring 22. Instead of openings 70, a plurality of catches of a different style, such as protrusions or passageways might be provided on the pivot plate 56. As a further alternative, a plurality of protrusions 66 or openings might be arrayed on the lower portion 38 of the radial arms 14, 16.

The foregoing description and drawings merely explain and illustrate preferred embodiments of the invention and the invention is not limited thereto, except insofar as the claims are so limited. Those skilled in the art, who have the disclosure before them, will be able to make modifications and variations therein without departing from the scope of the invention.

What is claimed is:

1. In a tarp deploying apparatus having a rear radial arm pivotally attached proximate a rear wall and a front radial arm pivotally attached proximate a front wall, and having a tarp operably provided between free ends of the radial arms to selectively cover a space between the front and rear walls, the improvement comprising:

the rear radial arm is formed with a bend to bring the free end of the rear radial arm closer to the rear wall than the free end of the rear radial arm would be without such a bend; and wherein a rear housing is attached to the rear radial arm proximate to the free end of the rear radial arm and a front housing is attached to the front radial arm proximate to the free end of the front radial arm, wherein the front housing has a front rotatable spindle extending therefrom and the rear housing has a rear rotatable spindle extending therefrom, wherein the front spindle is connected to a front end of a roll tube and the rear spindle is connected to a rear end of the roll tube, wherein a motor is associated with one of the spindles, and wherein the tarp is provided on the roll tube, the tarp deploying apparatus further comprising a roller on the roll tube, the roller having an enhanced traction surface.

2. The improved tarp deploying apparatus of claim 1, wherein the roller comprises a resilient body.

3. The improved tarp deploying apparatus of claim 2, further comprising a raised tread pattern on the roller, the raised tread pattern including the enhanced traction surface.

4. The improved tarp deploying apparatus of claim 3 wherein the raised tread pattern is formed on a traction sleeve attached to the resilient body.

5. The improved tarp deploying apparatus of claim 1, further comprising torsion springs that provide a biasing force that biases the radial arms towards a deployed position wherein the tarp covers the space between the front and rear walls, and wherein the torsion springs are selectively adjustable to a plurality of positions to permit control of the biasing force.

6. The improved tarp deploying apparatus of claim 5 further comprising:

a pivot plate operably connected with the rear wall, the pivot plate including a plurality of catches, the rear radial arm having a lower portion and the lower portion of the rear radial arm engaging a first portion of the one of the torsion springs, a second portion of one of the torsion springs being received within one of the catches; and a shaft extending between the pivot plate and the lower portion of the rear radial arm to pivotally connect the lower portion of the rear radial arm to the pivot plate with the one of the torsion springs captured between the pivot plate and the lower portion of the rear radial arm.

7. The improved tarp deploying apparatus of claim 6, wherein the catches are openings through the pivot plates.

8. The improved tarp deploying apparatus of claim 7, wherein the catches of the plurality of catches are arrayed in a circular pattern around the shaft.

9. The improved tarp deploying apparatus of claim 1, wherein the front and rear walls are walls on a tub of a side dump trailer.

\* \* \* \* \*